(12) United States Patent
Friesth et al.

(10) Patent No.: US 8,668,433 B2
(45) Date of Patent: Mar. 11, 2014

(54) MULTI-TURBINE AIRFLOW AMPLIFYING GENERATOR

(75) Inventors: Kevin L. Friesth, Fort Dodge, IA (US); Franklin Joseph Desrochers, Clarkston, MI (US)

(73) Assignee: Kevin L. Friesth, Fort Dodge, IA (US)

(*) Notice: Subject to any disclaimer, the term of this patent is extended or adjusted under 35 U.S.C. 154(b) by 1500 days.

(21) Appl. No.: 11/999,811

(22) Filed: Dec. 7, 2007

(65) Prior Publication Data

US 2008/0093861 A1 Apr. 24, 2008

Related U.S. Application Data

(63) Continuation-in-part of application No. 11/315,711, filed on Dec. 22, 2005, now Pat. No. 7,758,300.

(51) Int. Cl.
*F03D 1/02* (2006.01)
*F03D 1/04* (2006.01)

(52) U.S. Cl.
USPC ........... 415/4.3; 415/4.5; 415/58.5; 415/58.7; 415/60; 415/62; 415/67; 415/68; 415/144; 290/55

(58) Field of Classification Search
USPC ............ 415/2.1, 4.3, 4.5, 60, 62, 67–69, 905, 415/908, 58.5, 58.7, 144, 145; 416/9–11, 416/117, 119, 120, 124, 125, 170 R, 174, 416/244 R, 244 A, DIG. 6; 290/43, 44, 54, 55
See application file for complete search history.

(56) References Cited

U.S. PATENT DOCUMENTS

| 1,345,022 | A | 6/1920 | Oliver |
| 2,388,377 | A | 11/1945 | Albers |
| 3,339,078 | A | 8/1967 | Crompton |
| 3,944,839 | A | 3/1976 | Carter |

(Continued)

FOREIGN PATENT DOCUMENTS

| WO | WO-94/25750 | 11/1994 |
| WO | WO-2005/008062 | 1/2005 |
| WO | PCT/US2008/013374 | 3/2009 |

OTHER PUBLICATIONS

Duffy, Robert E., "Verif. Analysis of the Toroidal Accelerator Rotor Platform Wind Energy Conv. System", Rensselaer Polytechnic Institute, Sep. 1988.

(Continued)

*Primary Examiner* — Christopher Verdier
(74) *Attorney, Agent, or Firm* — Brick Gentry PC; Brian J. Laurenzo; Jessica L. Susie

(57) ABSTRACT

A wind generating device employs modules each having two turbines. Each of the turbines employs two rotors coaxially aligned by a shaft associated with an in-line generator. Alternatively, the turbine employs only one rotor for low wind areas. The arrangement includes a proximal channel with a leading portion having decreasing radius toward the first rotor which acts as a collector and a following portion connecting fluidly the first and second rotor and a distal channel which is separate from the proximal channel and opens into the following portion thereby adding to the airflow to the second rotor. Downstream from the second rotor is a diffuser with a radius increasing with distance from the rotor. The modules may be stacked vertically stacked which allows for yaw responsive to wind. The modules may be mounted on a tower.

33 Claims, 9 Drawing Sheets

(56) References Cited

U.S. PATENT DOCUMENTS

| | | | |
|---|---|---|---|
| 4,075,500 | A | 2/1978 | Oman et al. |
| 4,079,264 | A | 3/1978 | Cohen |
| 4,080,100 | A | 3/1978 | McNeese |
| 4,134,707 | A | 1/1979 | Ewers |
| 4,184,084 | A | 1/1980 | Crehore |
| 4,204,799 | A | 5/1980 | deGeus |
| 4,345,161 | A | 8/1982 | Crompton |
| 4,516,907 | A | 5/1985 | Edwards |
| 4,550,259 | A | 10/1985 | Bertels |
| 4,781,522 | A | 11/1988 | Wolfram |
| 5,062,765 | A | 11/1991 | McConachy |
| 5,182,458 | A | 1/1993 | McConachy |
| 5,429,480 | A | 7/1995 | Van Der Veken |
| 5,464,320 | A | 11/1995 | Finney |
| 5,520,505 | A | 5/1996 | Weisbrich |
| 5,836,738 | A * | 11/1998 | Finney ............... 415/60 |
| 6,249,059 | B1 * | 6/2001 | Hosoda ............... 290/55 |
| 6,294,844 | B1 | 9/2001 | Lagerwey |
| 6,472,768 | B1 | 10/2002 | Salls |
| 6,674,181 | B2 | 1/2004 | Harbison |
| 6,749,399 | B2 | 6/2004 | Heronemus |
| 6,856,042 | B1 | 2/2005 | Kubota |
| 7,758,300 | B2 * | 7/2010 | Friesth ............... 415/4.3 |
| 2003/0138315 | A1 | 7/2003 | Brueckner |
| 2003/0178855 | A1 | 9/2003 | Li |
| 2005/0074324 | A1 | 4/2005 | Yoo |

OTHER PUBLICATIONS

E.A. Badr, R.F. Ghajar, "School of Eng. and Architecture, Byblos, Lebanon, Power Augmentation of Wind Turbines", Experimental Study.

Gilbert, et al., "Experimental Demonstration of the Diffuser-Augmented Wind Turbine Concept", J. Energy, Jul.-Aug. 1979, vol. 3 No. 4, Grumman Aserospace Corp., Bethpage, NY.

Gilbert, et al., "Fluid Dynamics of Diffuser-Augmented Wind Turbines", J. Energy, Nov.-Dec. 1978, vol. 2, No. 6, Grumman Aerospace Corp., Bethpage, NY.

Igra, Ozer, "Preliminary Results from the Shrouded Wind-Turbine Pilot Plant", J. Energy, Jul.-Aug. 1980, vol. 4, No. 4.

Loth, J.L., "Wind Power Limitations Associated with Vortices", J. Energy, Jul.-Aug. 1978, vol. 2, No. 4.

Phillips, et al., "Aerodynamic Analysis and Monitoring of the Vortec 7 Diffuser-Augmented Wind Turbine", IPENZ Transactions, 1999, pp. 13-19, vol. 26, No. 1/EMCh.

Phillips, et al., "Diffuser Development for a Diffuser Augmented Wind Turbine Using Computational Fluid Dynamics", Dept. of Mech. Eng. Univ. of Auckland, New Zealand.

Weisbrich, Alfred L., "Mass Customization of Warp Wind Power Plant Design & Construction", Copyright ENECO, 1997, Proceedings of the American Power Conference, vol. 59, 1997.

* cited by examiner

MULTI-TURBINE AIRFLOW AMPLIFYING GENERATOR

CLAIM OF BENEFIT OF PRIORITY

This is a Continuation-In-Part of application Ser. No. 11/315,711 filed Dec. 22, 2005, now issued U.S. Pat. No. 7,758,300 and titled "Multi-turbine Airflow Amplifying Generator".

BACKGROUND OF THE INVENTION

1. Field of the Invention

The present invention relates in general to wind generated power and, more precisely, to airflow wind channel capture and airflow acceleration for the purpose of generating power.

2. Description of the Prior Art

It is known in the art to use turbine rotors of assorted designs and configurations for providing a rotational inertia output in response to air flow. However, prior art turbines, particularly for wind energy transformation, are limited in their effectiveness by commonly available low speed wind power transformation.

Many wind turbines are of the windmill variety wherein a multi-blade rotor is mounted so that it spins around an axis generally horizontal to the ground. The blades are exposed directly to the wind and are not housed by any means. As wind passes over and under each blade, pressure differentials cause the blades to rotate about the axis. This rotation turns gears which produces power. The amount of power or energy produced by these horizontal rotors is dependent on many factors one of the most important of which is the area swept by the rotor or, in other words, the length of the blades. Therefore, in its most common form, a tower may accommodate only a single rotor and a generator. Even the most efficient of these allows some fifty plus percent of the wind to pass through. It should be noted that some flow must be maintained through the rotor in order to produce any power at all, however, current turbines are less efficient than is desirable. The formula for power derived from the wind includes the velocity cubed. Common windmills do not accelerate the wind to take advantage of this cubing effect.

Other related art turbines attempt to capitalize on the increased velocity factor by employing a collector which includes a radius larger than the rotor at the aft end that narrows to almost equal that of the rotor. The collector captures, focuses, and accelerates more wind toward the turbine than that which would pass through a bare rotor. A turbine and collector combination may result in reducing the necessary size of the rotor. The collector allows collection of a wider range of wind directions and can greatly reduce dependence on yaw capabilities. The effects of the angle or surface curvature at which the collector's radius decreases toward the rotor on wind speed at the rotor's center or outer tips has not been well defined or studied. In addition, because a reduction of static pressure at the rotor is necessary to accelerate the wind speed passing through (and resulting power) a collector alone will not increase the power produced.

Some related art turbines are positioned in a shroud behind which a diffuser extends. The diffuser's radius increases with the distance from the rotor. As wind passes through the rotor, negative pressure will be induced at the throat with pressure recovery as it progresses to the exit. The negative pressure draws in more air through the turbine which, in turn, results in a production of more power than a bare turbine of the same size.

The amount of wind drawn through a turbine as a result of a diffuser is affected by what is known as boundary layer separation. This phenomenon occurs near the inner surface of the diffuser where wind "separates from" or does not closely follow the inner surface thereby decreasing the theoretical power increase otherwise expected. Related art has addressed this inefficiency by employing additional momentum obtained from tangential injection of the free wind around the outside of the diffuser through inlet slots in the diffuser. More than a single slot may be indicated depending on the size and angle of the diffuser wall relative to horizontal. By adding slots to address boundary layer separation, the angle at which a diffuser's inner surface extends can be increased and a complementary reduction in length achieved thereby reducing the length required by earlier diffuser designs.

More recent related art combines a collector, shroud, and diffuser. In addition to augmenting the power over a bare turbine, this combination shortens the time for cut-in of the turbine thus converting energy at a lower wind speed.

The traditional school of thought includes the use of massive and very long rotors for which diffusers and collectors would be both expensive and heavy. Therefore, studies have been completed to test whether the power augmentation of a given diffuser configuration would be reduced if the trailing edge of the diffuser rested on or was near the ground. These studies revealed that when the ground plane was near the trailing edge, there appeared to be an augmentation of power and that there was no decrease in power. Further studies showed the velocity across the blade plane could be improved using a bullnose on the diffuser inlet and parabolic nose cone in front of the rotor hub.

None of the related art addressed the problems heretofore suffered by large turbines. For example, tower structure expense and size. The tower must be high to support the turbine and, due to the turbine's weight, the structure must be equally substantial as well as equipped to function against wind shear.

In addition, related art mostly employ single rotors that generate no power if the rotor fails. Finally, although efforts have been made to augment the power of a turbine, no efforts seem to have been made to actually use more of the wind mass passing the rotor blades.

More recently, related art has considered using a multiple of modules housing small rotors stacked vertically. These arrangements require less land area and provide redundancy such that the malfunction of one rotor does not shut down power generation. Specifically, this arrangement employs toroidal accelerator rotor platform systems which function by placing an obstruction in the path of the wind which causes the air to accelerate around it. A rotor is then placed in the region of highest local velocity. Using multiple such rotors substantially increases the system power output over rotors in free stream. The system uses the inner part of a toroid with a pair of rotors mounted in the semi-circular channel separated by 180 degrees so that both face the wind. Toroidal modules are then stacked upon one another. The rotors are free to yaw within the channel to face the wind.

The present invention differs from the above referenced inventions and others similar in that these prior devices typically employ one turbine per tower and depend on very large rotor swept areas. Although strides have been made to augment wind power using collectors and diffusers, even the modular types employing smaller rotors still allow over half of the wind (and its power) to pass through rotors unhindered and unharnessed.

One object of the present invention is to greatly enhance the power produced by a single tower by augmenting the power of each turbine and by utilizing more of the wind passing through the rotors;

A second object of the present invention is to provide a device that uses air channels to amplify airflow through the rotor along with associated collectors and diffusers;

A third object of the present invention is to provide a device wherein multiple rotors may be associated with one another to enhance efficiency;

A fourth object of the present invention is to reduce tower structure needs;

A fifth object of the present invention is to provide selective pitch control for rotors;

A sixth object of the present invention is to effectively capture and use wind power from any direction;

A seventh objective is to reduce the costs associated with wind power production by increasing the power produced per tower erected and decreasing the cost of components, reduces land use and greatly increases the ratio of electricity generated to erected tower cost; and An eighth objective is to provide a wind power generative device that is more avian friendly by providing physical profiles detectable by birds and bats;

A ninth objective is to provide a wind power generative device that does not require gear boxes to transfer mechanical energy to generators; and A tenth objective is to is to provide a wind power generative device that takes advantage of the stronger and steadier winds available at higher altitudes.

SUMMARY

The present invention provides an energy generating device comprising a tower structure and at least one—but preferably a plurality of—wind amplifying multi-turbine modules. In the preferred embodiment, two turbines are employed in each wind amplifying module and, while two said wind amplifying modules could be mounted side by side, the preferred embodiment employs generally vertical relativity. Each wind amplifying module of the preferred embodiment has a housing and two turbines. In a first preferred embodiment, each turbine has a minor outside opening fluidly connected to a proximal rotor and a proximal air channel, a major outside opening fluidly connected to a distal air channel and a distal rotor. The proximal rotor and the distal rotor are fluidly connected by the proximal air channel such that airflow to the distal rotor includes that which has passed through the proximal rotor in addition to that which has been collected by the distal air channel. The design of the proximal air channel near the minor opening includes a collector section having convex or concave sides into which wind enters and passes through the proximal rotor. The distal channel opens into the proximal channel behind the proximal rotor. This placement minimizes boundary layer separation while at the same time supplementing the wind mass and velocity passing through the distal rotor. The rotors are connected by a shaft and an in-line generator associated with the shaft converts mechanical energy from the rotors into electrical energy. In a second preferred embodiment for low wind areas, the turbine only has the distal rotor and the generator is associated with the distal rotor.

Each module also includes means for mounting each said module to the tower structure to allow generally horizontal yawing, a plurality of structural elements for support and strength. Means for mounting in the preferred embodiment comprise a stationary support associated with the tower structure, a support deck associated with each module, and both vertical and horizontal support rollers associated with the support deck. The rollers and the support deck are mounted on a bottom surface of the module housing. A yaw deck and additional vertical and horizontal support rollers are mounted on a top surface of the module housing. This arrangement provides a rotationally active interface between vertically stacked modules which allows the modules to yaw about a vertical axis of the tower while maintaining vertical placement. One modification uses a generally ring-like support deck integrally formed with the housing. The tower protrudes through an opening in the housing and through an opening in the stationary support.

The preferred embodiment of the energy generating device includes means for lifting each module vertically along the height of the tower structure for assembly purposes and for maintenance purposes. Means for lifting provided by the preferred embodiment comprises a winch and crane arm at the top of the tower structure. It should be understood that many modules may be combined in a single energy generating device of the present invention.

For each turbine, the minor outside opening comprises a radius larger than and decreasing along the proximal air channel to approximately equal the proximal rotor such that air flow through said rotor is amplified both in mass and velocity. The major opening is fluidly connected with said distal rotor through said distal air channel and separated from said minor opening. A diffuser having a radius gradually increasing with distance from the second rotor creates negative pressure at the rotors and amplifies the wind speed and mass through the proximal rotor and the distal rotor. Electrical energy is transported from the generators out and down the tower structure through successive yaw collars which are equipped with electrical contacts in continuous contact even as the module swings about the vertical axis of the tower. This arrangement provides a lighter, smaller, less expensive energy generating device.

Independent pitch control means are provided for each said rotor for maximizing efficiency. Mechanics known in the art including a motor are linked to the blades to change the angle of attack or pitch on each blade. This change alters the amount of wind affected by the rotor. Functionally this allows the turbine to maximize possible power production. Control of this change can be either manual or automated. The manual system would be adjustable only when rotational inertia was paused. An automated system would be controlled by an algorithm receiving signals from various sensors monitoring physical characteristics of wind flow and also mechanical characteristics of the rotor assembly. The automated system would use an iterative process based on the algorithm to adjust pitch and maximize power. The automated system would allow pitch to be modified when rotational inertia is present.

Structural elements employed in the module comprise a variety of shapes, sizes and arrangements which are dictated by the conditions and capacity of the energy generating device with which the module will be associated. The conditions include the total number of modules, expected wind velocities, number of turbines within the module, the height of this particular module relative to the ground and its placement relative to other modules. The plurality of structural elements in the preferred embodiment are uniformly spaced ribs both axially and concentrically oriented relative to the air channels relative to the axis of the rotors. However, it is contemplated that said elements could also comprise a webbed structure, ribs of various lengths and depths, positioned either internal or external to the wind channel or housing, or other similar devices.

The present invention provides an energy generating device modular in nature. Modules may be mounted together in any fashion deemed structurally safe. Modules are outfitted with electrical generating hardware optimally sized for the wind resources available at the location the modules are to be erected. Groups of modules may include but are not limited to configurations ranging from 1 to 60 modules mounted together in a fashion to generate between 50 kilowatts and 30 megawatts. The number of such energy generating devices that can be located on a given space of suitably characterized ground varies as numbers may increase or decrease with suitability. Compared to other energy generating devices utilizing wind power, the present invention is projected to provide increased power output for less cost than currently accepted industry averages.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENTS

Figure 1:
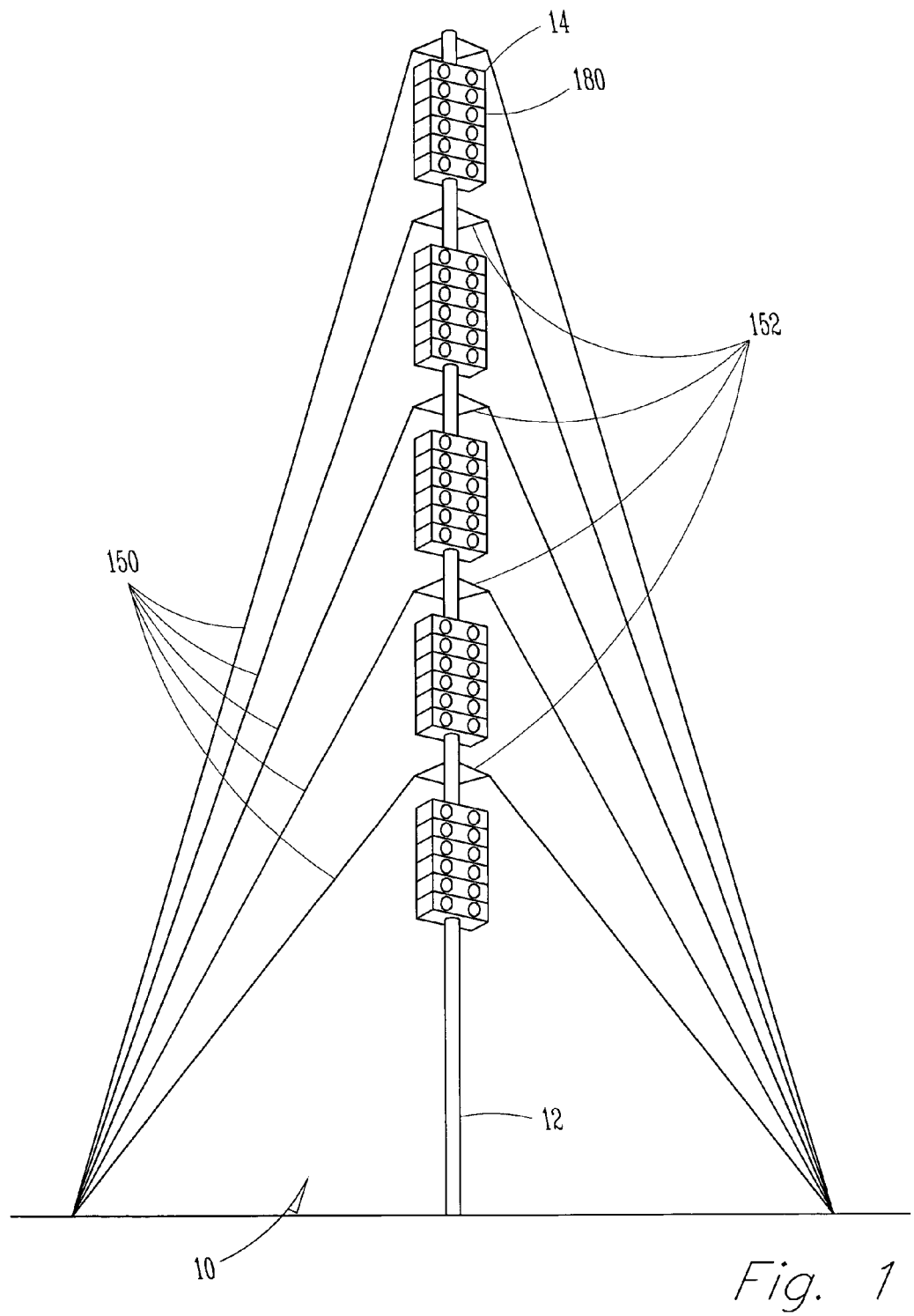
FIG. 1 is a perspective view of an energy generating device of the present invention.
Figure 2A:
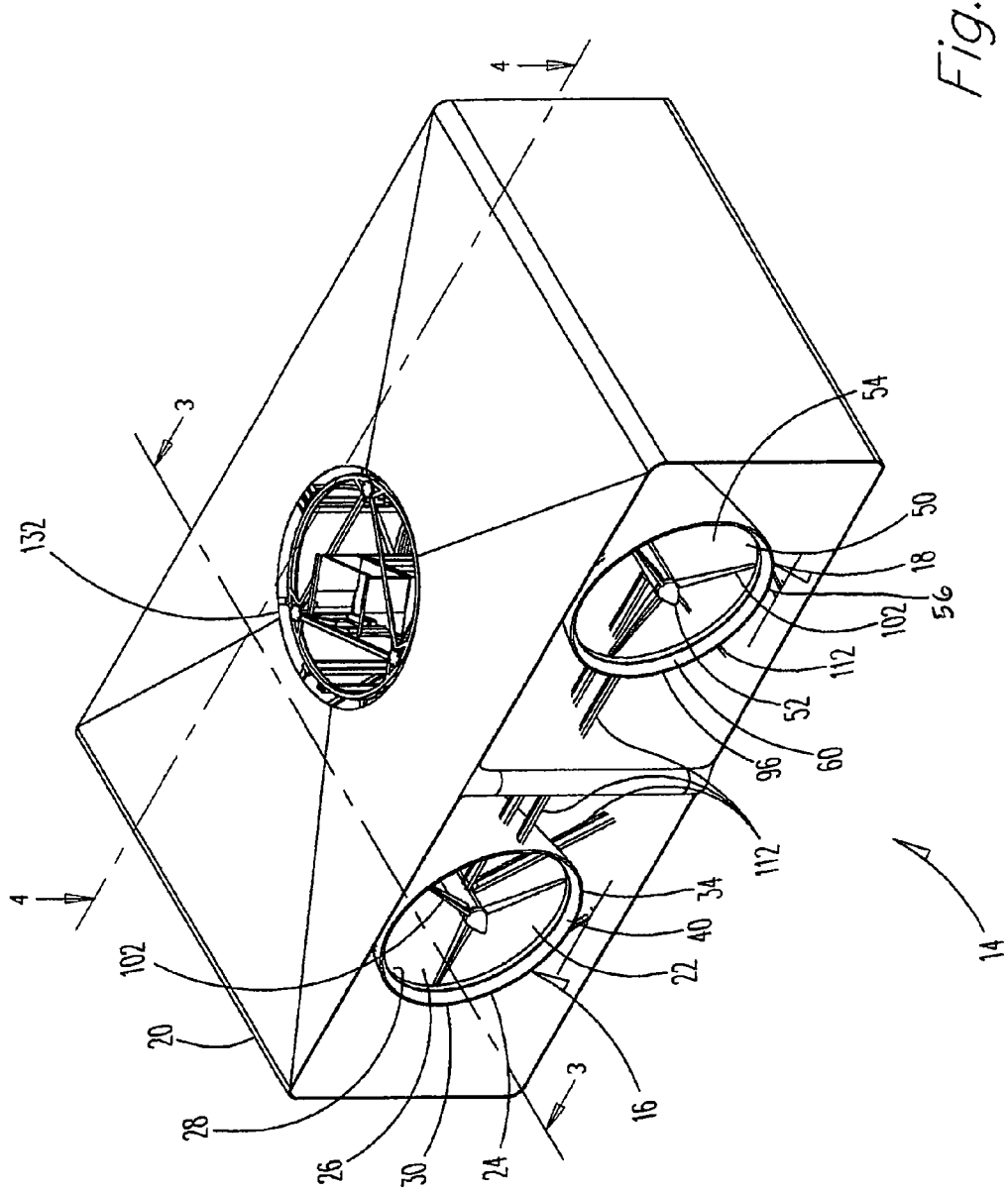
FIG. 2a is a perspective view of a wind amplifying module of a first preferred embodiment of the present invention.

The energy generating device of the present invention is shown generally as 10 in FIG. 1. The energy generating device 10 comprises a tower structure 12 and at least one but preferably a plurality of wind amplifying multi-turbine modules 14. In a first preferred embodiment shown in FIGS. 2a and 3, each module 14 employs a first turbine 16 and a second turbine 18. Each module 14 is surrounded by a housing 20, and the first turbine 16 has a proximal channel opening 22, a first proximal rotor 24, a first proximal air channel 26 having an inner surface 28 and a leading portion 30 and a following portion 32, a distal channel opening 34, a first distal rotor 36, and a first distal air channel 38 having a surface 40. A diffuser 42 having an inner surface 44 is positioned just behind the first distal rotor 36. The second turbine 18 comprises a second proximal channel opening 50, a second proximal rotor 52, a second proximal air channel 54, a second distal channel opening 56, a second distal rotor 58, and a second distal air channel 60, shown in FIG. 4.

Figure 3:
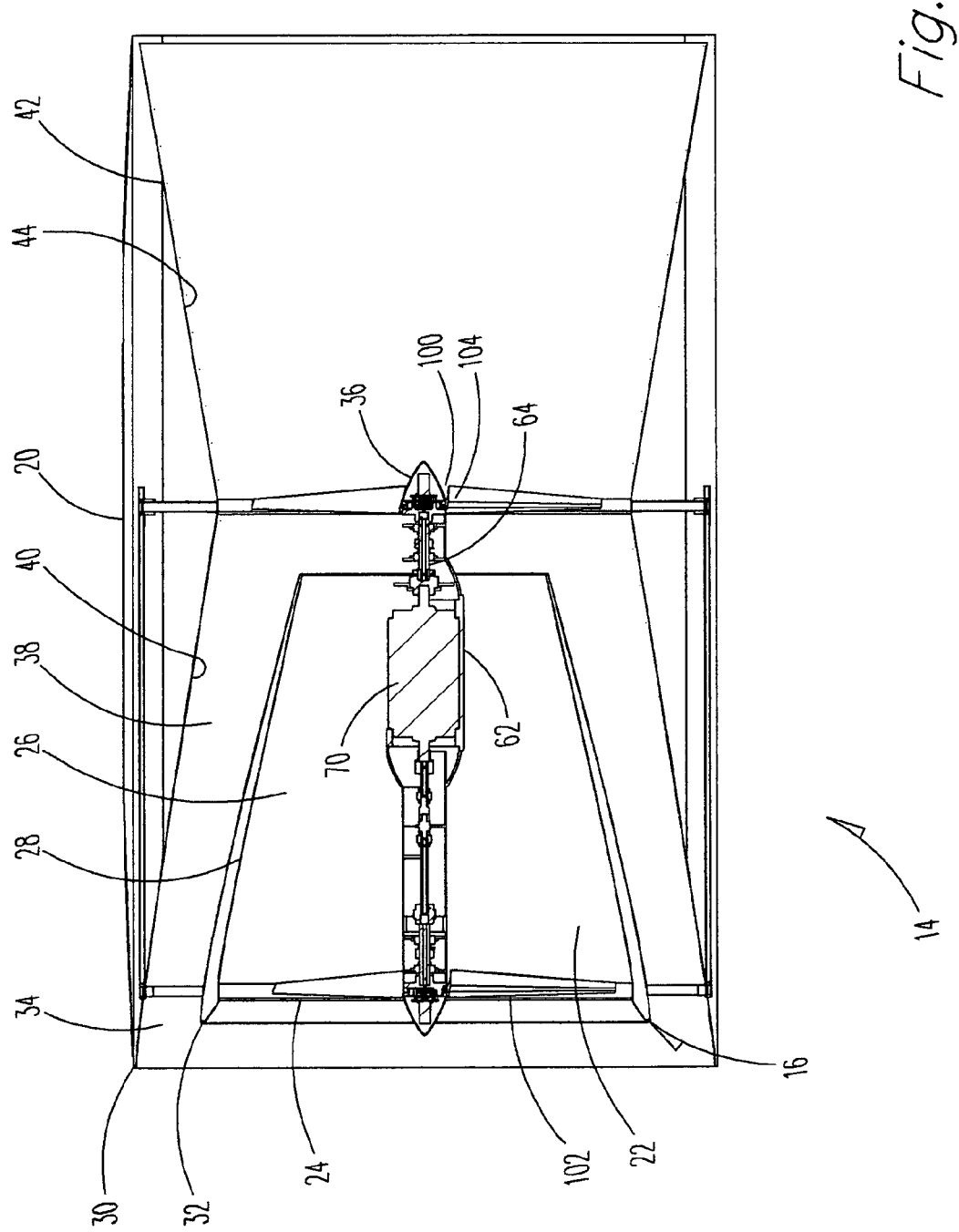
FIG. 3 is a side view in elevation of a cross section of FIG. 2a along line 3-3.

Referring again to FIG. 3, the proximal rotors 24 and 52 respectively, and the distal rotors 36 and 58, respectively are in fluid communication such that airflow into the distal rotor 36 includes that which has passed through the proximal rotor 24 in addition to that which has passed through the distal air channel 38. As can be seen in FIG. 3, the proximal rotor 24 is substantially centered within the proximal opening 22, and the distal rotor 36 is generally axially aligned with and spaced apart from the proximal rotor 24. The proximal rotor 24 and distal rotor 36 are sequentially associated by means 62. In the first preferred embodiment, the means 62 is a drive shaft 64. To convert the mechanical energy of the rotors into electrical energy, each turbine 16 and 18 has an in-line generator 70. It is preferred that the generator 70 is associated with means 62 without the need for additional gearboxes. However, in-line gearboxes may be included if specific circumstances require them. It should be understood that many modules 14 may be combined in a single energy generator of the present invention.

Figure 5:
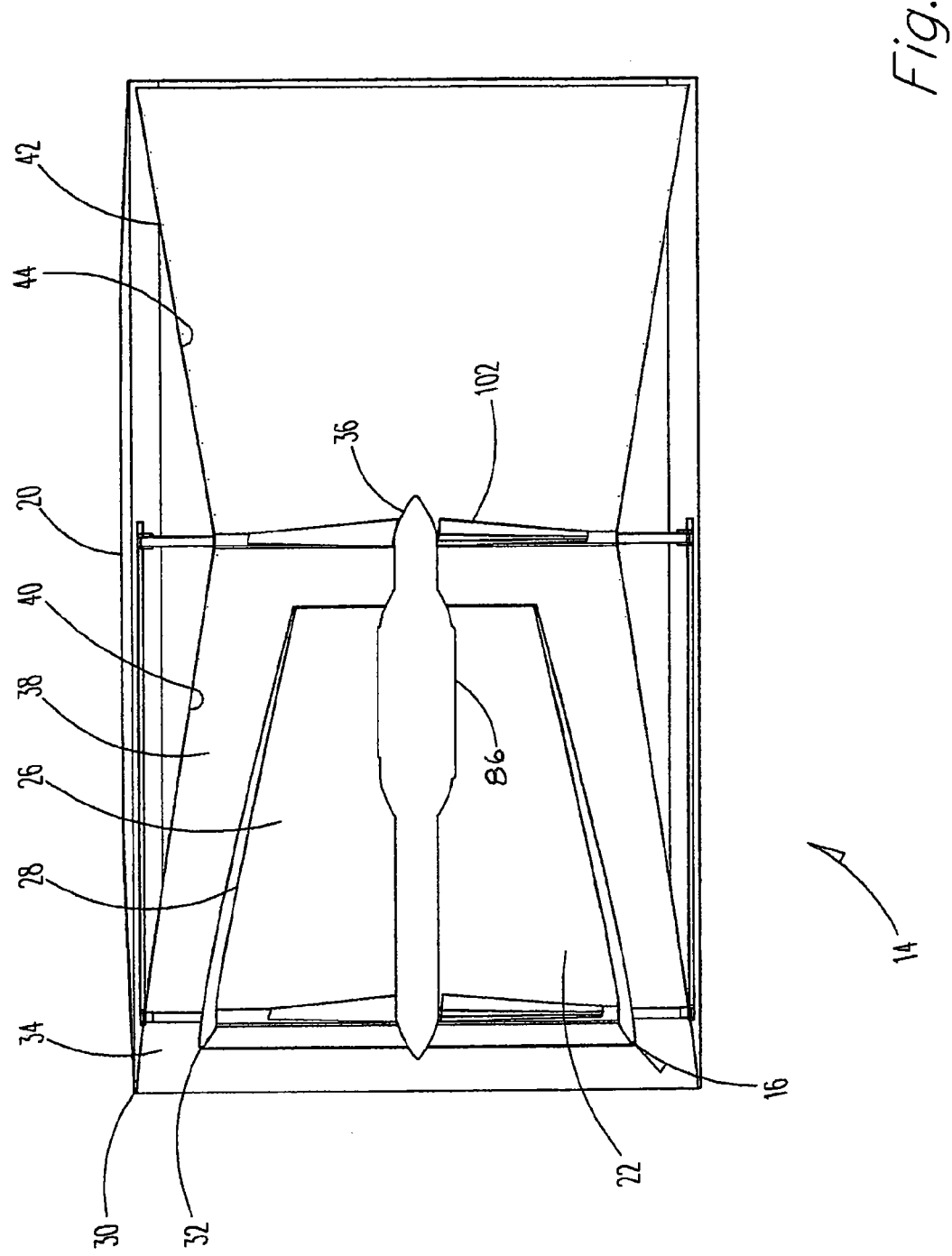
FIG. 5 is a side view in elevation of a cross section of FIG. 2a along line 3-3 showing a second preferred embodiment of the present invention.

The radius of the leading portion 30 of the proximal channel 26 is larger than the radius of the proximal rotor 24 and the radius of the proximal channel inwardly tapers toward the proximal rotor 24. The radius of the following portion 32 is nearly equal to the radius of the proximal rotor 24 such that in the first preferred embodiment air flow through the proximal rotor 24 is directed to the distal rotor 36. In a second preferred embodiment, shown in FIG. 5, the proximal channel serves as a collector only for generating greater airflow to the distal rotor 36.

The surface 28 may be convex or straight, and it is in fact preferable that the surface 28 be both convex and straight. The inventors have discovered that there is very little acceleration due to employing a concave surface when compared to a convex or straight surface. When convex or straight to the inside, the surface 28 acts as an object in the path of the wind and creates a higher local velocity and wind mass at the proximate rotor. Depending on the size of the turbine 16, it may be advantageous to employ only slight convexity to the surface 28 of the proximal channel 26. Where such inner surface 28 is convex toward the air channel, air flow can be moved closer to the center of the rotor thereby countering outflow otherwise expected.

The distal channel openings 34 and 56 are fluidly connected with the distal rotor 36 through the distal air channel 38 and therefore separated from the proximal channel opening 22. The diffuser 42 is fluidly connected to both the proximal rotor 24 and the distal rotor 36 to receive air flow from both. The inner surface 44 of the diffuser 42 angles outwardly such the radius of the diffuser 42 expands away from the distal rotor 36. The expanding radius of the diffuser 42 creates a negative pressure behind the distal rotor 36 which draws air through both rotors at higher mass and velocity.

The distal air channel 38 opens into the following portion 32 of the proximal channel 26 thereby adding tangential velocity to the air flow into the distal rotor 36 increasing the power generated as well as addressing and managing boundary layer separation otherwise expected at the inner surface 44 of the diffuser 42. Taking advantage of winds at high altitudes also increases the amount of energy generator per wind turbine.

In the second preferred embodiment of the module 14, the turbines 16 and 18 have only the distal rotors 36 and 58 and do not include the proximal rotors 24 and 52. Because the distal rotors 36 and 58 produce the majority of the energy generated, this second preferred embodiment is cost effective for use in low wind areas. The proximal rotors 24 and 52 may not contribute enough energy in low wind conditions to warrant their expense. Also in the second preferred embodiment, the means 62 is eliminated and the generator 86 is directly associated with each of the distal rotors 36 and 58.

Figure 4:
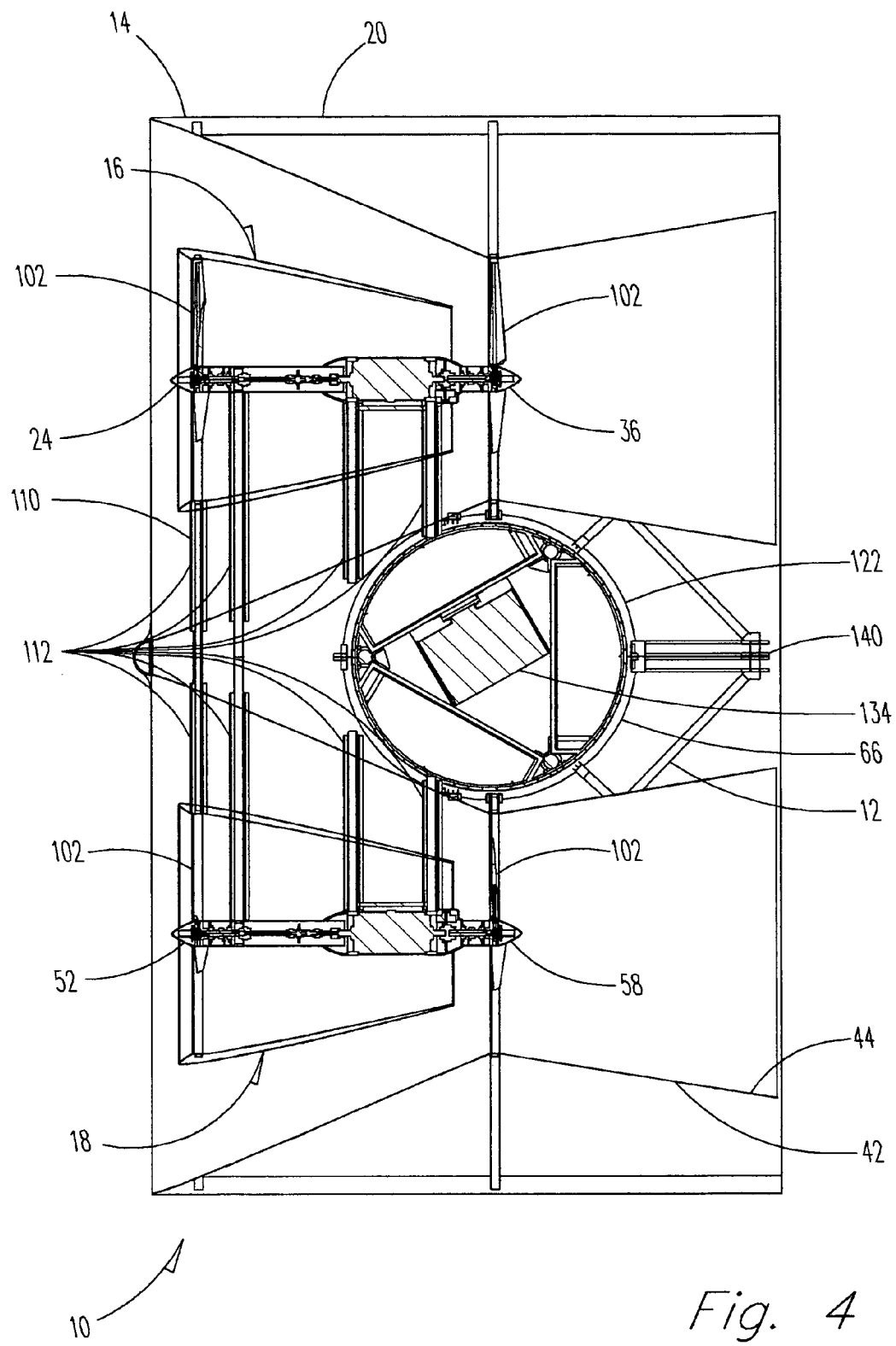
FIG. 4 is a top view in elevation of a cross section of FIG. 2a along line 4-4.

Again referring back to the first preferred embodiment of FIG. 3 and FIG. 4, means 62 for sequentially associating the rotors 24 and 36 further includes the following portion 32 of proximal air channel 26. Air flow that passes through the following portion 32 is subsequently combined with air flow through the distal channel 38. It is preferable that the radius of the following portion 32 tapers toward the distal rotor 36 until the radius of the following portion 32 is less than that of the distal rotor 36 thereby focusing the airflow toward the middle of the distal rotor 36 to avoid outflow.

Figure 2B:
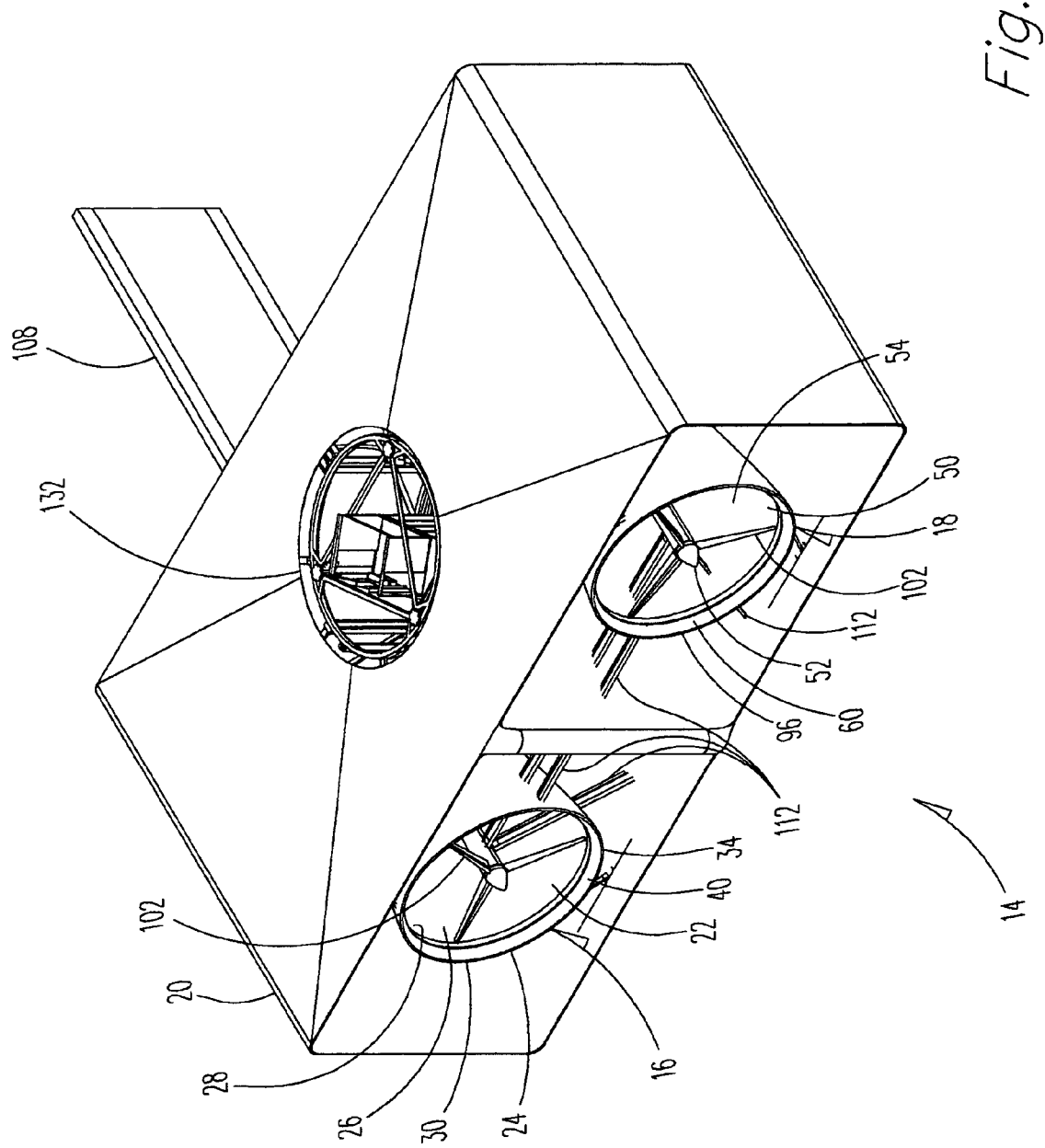
FIG. 2b perspective view of a wind amplifying module of a third preferred embodiment of the present invention.

Each rotor in the first preferred embodiment, rotors 24, 36, 52, and 58, and the second preferred embodiment, rotors 36 and 58, has an independent means 100 for controlling pitch to maximize energy efficiency. The rotors 24, 36, 52, and 58 each have plurality of blades 102. The means 100 of the preferred embodiment includes a motor 104 associated with each blade 102 to rotate each blade 102. The motor 104 can be controlled either manually or automatically in response to changes in wind speeds and direction. Automation of the motor 104 may be accomplished by use of a computer and wind sensors (not shown). Balance of each module 14 relative to the wind direction is achieved via proper placement of the channel openings 22, 34, 50, and 56. In a third preferred embodiment, shown in FIG. 2b, the module 14 is further balanced by inclusion of a rudder 108 located between the turbines 16 and 18 and opposite the openings 22, 24, 50, and 56.

The preferred module 14 is strengthened by a plurality of structural elements 110 shown in FIG. 4 as extending into the turbines 16 and 18. Although the structural elements 110 of the preferred embodiments are uniformly spaced concentrically oriented ribs 112, the structural elements may be of any shape, size, or arrangement. The form of the structural elements 110 depend upon such factors as the wind conditions, size of the module 14, the total number of modules 14, number of turbines 16 and or 18, altitude of the module 14, and placement of the module relative to other modules. It is contemplated that the structural elements 110 could be a webbed structure, ribs of various lengths and depths, internal or external to the air channels 26 and 28 or the housing 20. The ribs 112 of the preferred embodiments are both axially and concentrically oriented relative to the channels 26 and 38 and to the axis of the rotors 16 and 18.

The preferred turbine 16 is composed of low cost off-the-shelf small generators and the preferred blades 102 are short turbine blades. Unlike long turbine blades, short turbine blades can be manufactured without esoteric materials or special fabrication techniques. By reducing the costs of components and concentrating output via stacking of multiple turbines, the preferred embodiment has increased power per cost of the erected tower 12.

Figure 6:
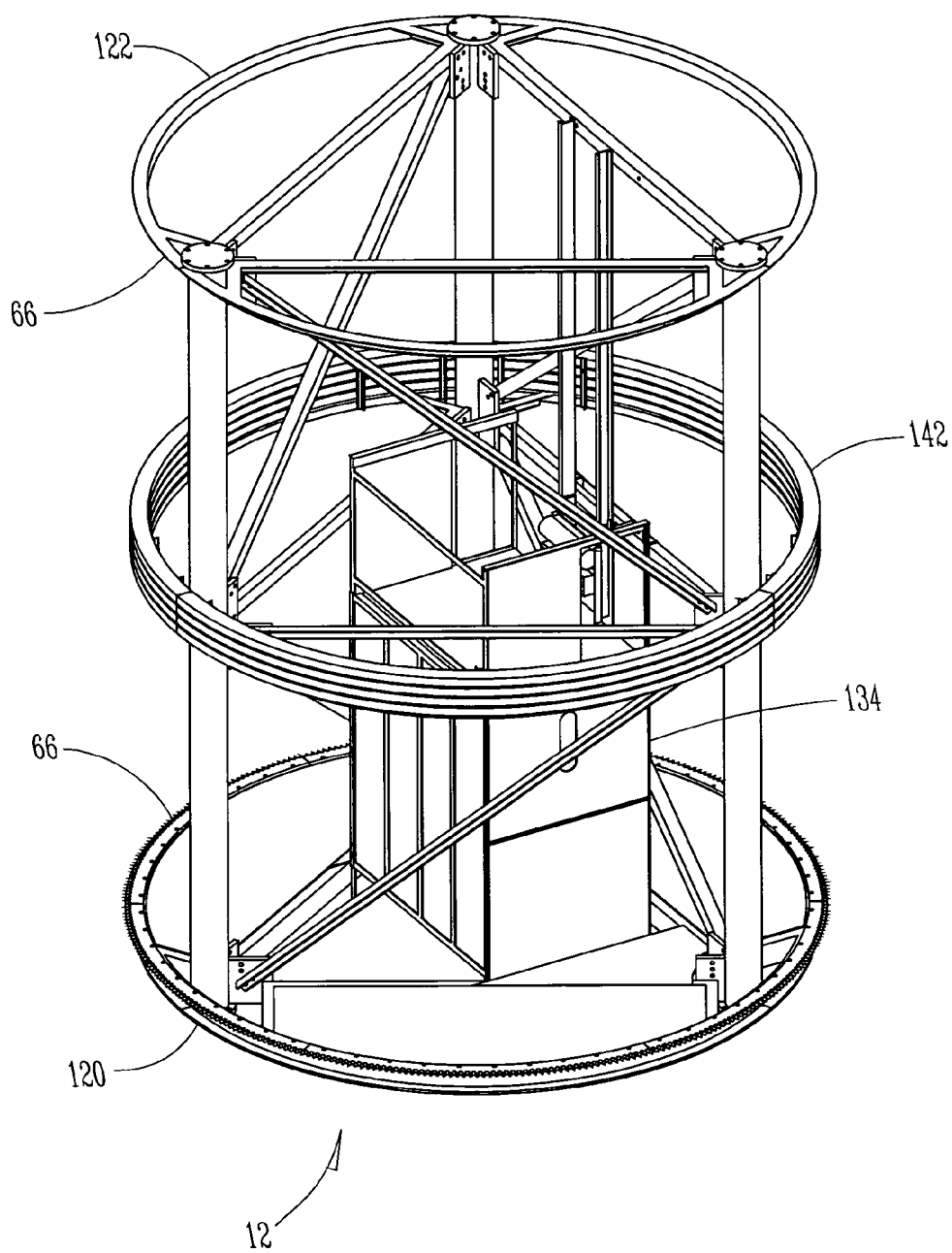
FIG. 6 is a perspective view of a portion of a tower structure showing means for mounting of the preferred embodiment of the present invention.
Figure 7:
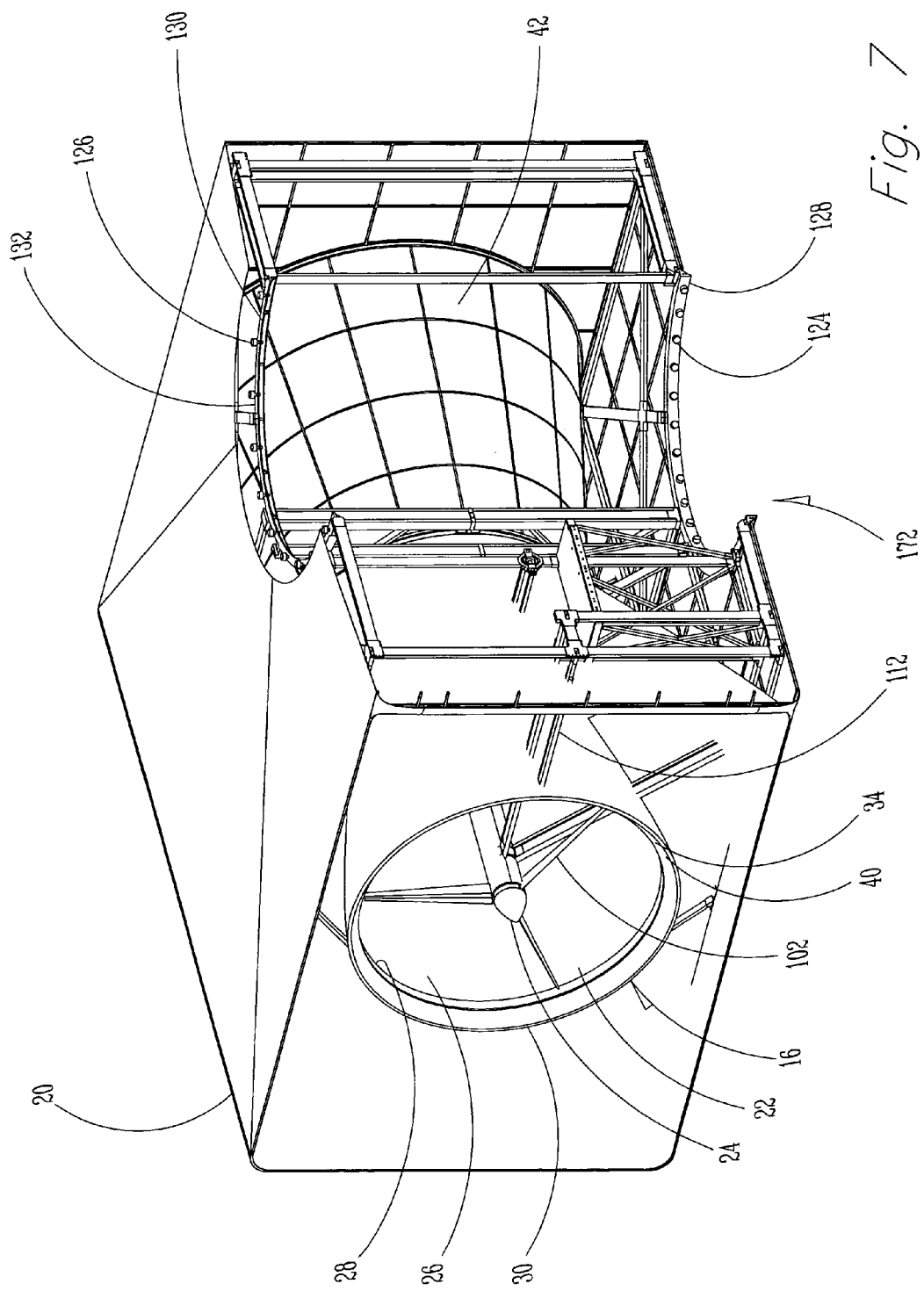
FIG. 7 is a perspective view of a half-module of the preferred embodiment of the present invention.

Referring now to FIG. 6 showing a portion of the tower structure 12 and the preferred means 66 for mounting the module 14. The preferred means 66 should allow generally horizontal yawing of the module 14 with respect to the tower 12. To accomplish yawing, the preferred means 66 includes a stationary ring support 120 below a stabilizing support 122. Both supports 120 and 122 are associated with the tower structure 12. Corresponding to the ring support 120, a plurality of horizontal support rollers 124 and a plurality of vertical support rollers 126, shown in FIG. 7, are positioned on a lower surface 128 and an upper surface 130, respectively, of the module housing 20. These surfaces 128 and 130 define an aperture 132 in the housing 20, the aperture 132 running generally vertically through the module 14. The ring support 120 provides the support for the module 14 while the stabilizing support 122 prevents the module 14 from moving beyond the horizontal axis. This arrangement provides a rotationally active interface between vertically stacked modules 14 which allows the modules to horizontally yaw about a vertical axis of the tower 12 while maintaining vertical placement. The modules 14 may yaw independently, or the modules 14 may be connected to yaw in groups.

Because the tower structure 12 of the preferred embodiments protrudes through the module 14, the interior of the tower structure may be used to hold additional elements such as an elevator 134 and a power rail 140. Referring again to FIG. 6, the elevator 134 runs vertically through the tower structure 12 and provides access to each module 14. To electrically associate each module 14 with the power rail 140, the tower also includes conductor slip rings 142 between each support 120 and 122. The power rail 140 is connected to each of the conductor slip rings 142 to electrically associate each module 14 and transfer power down the tower structure 12. Each of the conductor slip rings 142 is conductively associated with the turbines 16 and 18 allowing the module 14 to rotate without losing conductive contact. The tower 12 is preferably faced with a covering, except where each module 14 is mounted.

The tower structure 12 may be of such a height that it becomes unstable without additional support. The preferred embodiment, referring again to FIG. 1, is therefore anchored by guy wires 150. The guy wires 150 may be attached to the tower structure 12 directly, but it is preferred that the tower structure 12 include a plurality of struts 152 for attachment of the guy wires 150. The struts 152 extend sufficiently from the tower structure 12 to prevent contact between the guy wires 150 and the modules 14.

Figure 8:
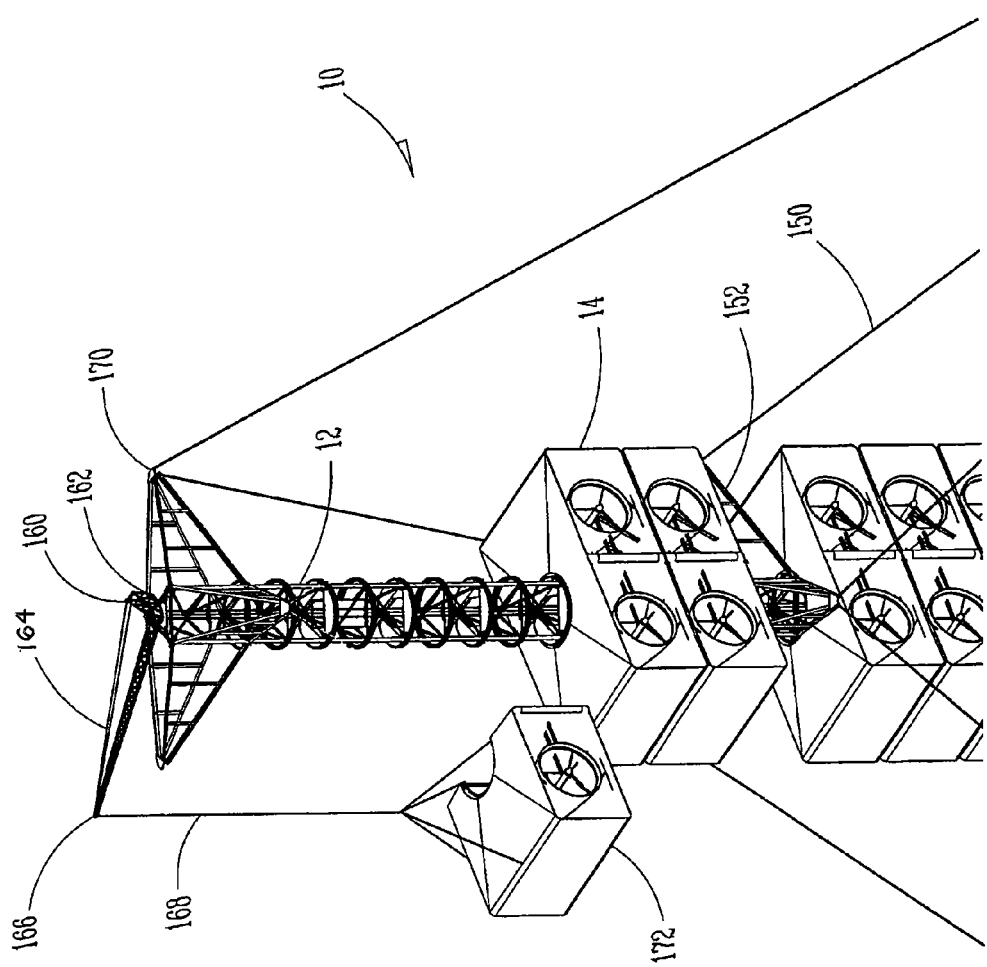
FIG. 8 is perspective view of portion of a tower structure showing means for lifting of the preferred embodiment of the present invention.

To aid in constructing and servicing the energy generating device 10, the preferred embodiment of the present invention includes means 160 for lifting the modules 14 onto the tower structure 12. The preferred embodiment of means 160 as shown in FIG. 8 and comprises a winching mechanism 162 and a crane arm 164 at least one support guide 166 and at least one cable 168. The winching mechanism is mounted on a top portion 170 of the tower structure 12 and the cable 168 is wound on the winching mechanism 162. To further aid in construction and maintenance, each module 14 is preferably formed from two half-modules 172, shown in detail in FIG. 7. The cable 168 is removably attached to one of the half-modules 172 for lifting it onto mounting means 66. The elevator 134 serves to move means 160 up the tower 12 as the tower 12 is constructed.

Many modifications and variations of the present invention are possible in light of the above teachings. For example, the tower structure 12 may be used with a variety of wind energy devices. Although in the preferred embodiments module 14 serves as a means for generative energy from airflow, other such means are contemplated for use with the tower structure 12. As another example, the diffuser 42, proximal channel 26, and distal channel 38 may be of any shape and size most beneficial for transferring mechanical energy including but not limited to a square. It should further be understood that although horizontal yawing is advantageous to allow the module 14 to harness as much wind energy as possible, means for mounting 66 need not require yawing. Though not preferred, rollers 124 and 126 can be eliminated and the module 14 can instead be attached to the tower 12.

Thus, the present invention has been described in an illustrative manner. It is to be understood that the terminology that has been used is intended to be in the nature of words of description rather than of limitation.

What is claimed is:

1. An energy generative device for harnessing airflow comprising:
   a) a wind amplifying module;
   b) a tower structure;
   c) said wind amplifying module comprises a housing in which is positioned a first turbine;
   d) said first turbine comprises:
      i. a distal rotor;
      ii. a proximal channel;
      iii. a distal channel annularly surrounding the proximal channel such that the proximal channel is fully contained within the distal channel and arranged such that airflow to said distal rotor includes that which has passed through said proximal channel and air flow provided by said distal channel; and
      iv. an in-line generator powered by said distal rotor.

2. The energy generative device as claimed in claim 1 further comprising a diffuser positioned in fluid communication with the distal rotor to accommodate air passing through the distal rotor.

3. The energy generating device of claim 2 further comprising:
   a) means for mounting said wind amplifying module onto said tower; and
   b) a plurality of structural elements to support and strengthen said energy generating device.

4. The energy generative device of claim 3 wherein said module is comprised of two half-modules and said tower structure comprises:
   a) a plurality of struts;
   b) a plurality of guy wires attached to said struts for supporting said tower structure;
   c) means for lifting said half-modules onto said tower structure; and
   d) an elevator inside said tower structure.

5. The energy generative device as claimed in claim 3 wherein said distal channel comprises a distal channel opening in which said proximal channel is positioned, and a surface spaced apart from and outside of said proximal channel to conduct airflow to said distal rotor, and said distal rotor positioned relative to said distal channel to receive airflow from the proximal rotor, the proximal channel, and the distal channel.

6. The energy generative device as claimed in claim 5 wherein said proximal channel further comprises a following portion in fluid communication with said distal rotor and said distal channel.

7. The energy generating device of claim 3 wherein said means for mounting allows for horizontal yawing of said module.

8. The energy generating device of claim 7 wherein said device 10 further comprises:
   a) said housing includes:
      i. a lower surface having a plurality of horizontal rollers;
      ii. an upper surface having a plurality of vertical rollers; and
      iii. said first surface and said second surface define an aperture through said housing;
   b) said means for mounting includes:
      i. a ring support attached to said tower structure and associated with said plurality of horizontal rollers;
      ii. a stabilizing support ring attached to said tower above said ring support and associated with said plurality of vertical rollers; and
      iii. said support rings and in association with said rollers and, respectively, allow horizontal yawing of said module with respect to said tower.

9. The energy generative device of claim 8 wherein said support rings 120 and 122 are substantially circular and surround said tower and said surfaces 128 and 130 are substantially circular and said rollers 124 and 126 surround said aperture 132 along said surfaces 128 and 130, respectively.

10. The energy generative device of claim 8 wherein said module 14 is comprised of two half-modules 172 and said tower structure 12 comprises:
    e) a plurality of struts 152;
    f) a plurality of guy wires 150 attached to said struts 152 for supporting said tower structure 12;
    h) an elevator 134 inside said tower structure.

11. The energy generative device of claim 10 where said tower structure 12 further includes a top portion 170, said lifting means 160 is mounted on said top portion 170, and said lifting means 160 comprises:
    a) a winching mechanism 162;
    b) a crane arm 164;
    c) at least one support guide 166; and
    d) at least one cable 168 for removable attachment to said half-modules 172.

12. The energy generating device of claim 10 wherein said tower structure further includes a power rail 140 running vertically along said tower 12 and connected to a conductor slip ring 42 between each said support rings 120 and 122, said conductor slip ring 142 conductively associated with said turbine 16 for transferring power from said turbine 16 to said power rail 140.

13. The energy generative device as claimed in claim 1 wherein said first turbine further comprises:
    a) a proximal rotor;
    b) said proximal rotor is generally coaxially spaced apart from said distal rotor such that airflow to said distal rotor further includes that which has passed through said proximal rotor;
    c) means for associating said rotors; and
    d) said in-line generator is powered by said rotors and through said means for associating said rotors.

14. The energy generative device as claimed in claim 13 wherein said proximal channel comprises a proximal opening in which said proximal rotor is substantially centered and an inner surface having a leading portion, the radius of said leading portion being larger than the radius of said proximal rotor acting as a collector and a following portion in fluid communication with said distal rotor.

15. The energy generative device as claimed in claim 14 wherein said surface is shaped convex or straight and not concave to the interior of said proximal channel.

16. The energy generative device as claimed in claim 14 wherein said distal channel comprises a distal channel opening in which said proximal channel is positioned and a surface spaced apart from and outside of said proximal channel to conduct airflow to said distal rotor.

17. The energy generative device as claimed in claim 16 wherein said distal rotor is axially aligned with said proximal rotor and said proximal channel and positioned relative to said distal channel to receive airflow from the proximal rotor, the proximal channel, and the distal channel.

18. The energy generating device of claim 16 wherein said module further includes a rudder positioned between the first turbine and a second turbine and associated with said housing to provide balance and wind orientation.

19. The energy generative device as claimed in claim 14 wherein said first turbine further comprises a diffuser positioned in fluid communication with the distal rotor to accommodate air passing through the distal rotor.

20. The energy generative device as claimed in claim 19 wherein said diffuser comprises an inner surface, the radius of said inner surface expanding outwardly from said distal rotor.

21. The energy generating device of claim 14 wherein said device includes a plurality of said modules.

22. The energy generating device of claim 14 wherein said proximal rotor further comprises a plurality of blades and means for controlling the pitch of said plurality of blades.

23. The energy generative device as claimed in claim 13 wherein said proximal channel comprises a proximal opening in which said proximal rotor is substantially centered and an inner surface including a leading portion, the radius of said leading portion being larger than the radius of said proximal rotor for collecting air flow into said proximal rotor.

24. The energy generating device of claim 13 wherein said means for associating said rotors and is a drive shaft.

25. The energy generating device of claim 13 further comprising a plurality of structural elements for supporting said turbine.

26. The energy generating device of claim 25 wherein said plurality of structural elements include a plurality of uniformly spaced ribs axially and concentrically oriented with respect to the axis of said proximal and said distal rotors.

27. An energy generative device for harnessing airflow comprising:
   a) a wind amplifying module;
   b) a tower structure;
   c) said wind amplifying module comprises a housing 20 in which is positioned a first turbine;
   d) said first turbine comprises:
      i. a distal rotor;
      ii. a proximal channel having a proximal opening and an inner surface having a leading portion and a following portion in fluid communication with said distal rotor, said surface is shaped convex or straight and not concave to the interior of said proximal channel;
      iii. a distal channel fluidly connected to said distal rotor conducting airflow passing through said proximal channel and air flow provided by said distal channel to said distal rotor, said distal channel having a distal channel opening positioned around said proximal channel and a surface spaced apart from and annularly surrounding said proximal channel, such that said proximal channel is completely contained within said distal channel;
      iv. an in-line generator powered by said distal rotor; and
      v. a diffuser positioned in fluid communication with the distal rotor to accommodate air passing through the distal rotor.

28. The energy generative device as claimed in claim 27 wherein said first turbine further comprises:
   a) a proximal rotor substantially centered in said proximal opening, the radius of said proximal rotor being smaller than the radius of said leading portion;
   b) said proximal rotor generally coaxially spaced apart from said distal rotor wherein airflow to said distal rotor further includes airflow having passed through said proximal rotor;
   c) means for associating said rotors;
   d) said in-line generator powered by said rotors and through said means for associating said rotors;
   e) the radius of said leading portion being larger than the radius of said proximal rotor and a following portion in fluid communication with said distal rotor; and
   f) said distal rotor generally axially aligned with said proximal rotor and said proximal channel and positioned relative to said distal channel to receive airflow from said distal channel, said proximal rotor, and said distal rotor.

29. An energy generative device for harnessing airflow comprising:
   a) a tower structure;
   b) a plurality of means for generating energy from airflow;
   c) means for mounting each of said means for generating energy from airflow on said tower structure allowing horizontal yawing of each of said means for generating energy from airflow;
   d) a plurality of conductor slip rings conductively associated with each of said plurality of means for generating energy from airflow; and
   e) a power rail running vertically along said tower structure and connecting to each of said plurality of conductor slip rings.

30. The energy generative device as claimed in claim 29 wherein said tower structure further includes a plurality of struts and a plurality of guy wires attached to said struts for supporting said tower structure.

31. The energy generative device as claimed in claim 30 wherein said tower structure further includes an internal elevator.

32. The energy generative device as claimed in claim 31 wherein said tower structure includes means for lifting each of said means for generating energy from airflow onto said tower structure.

33. The energy generative device as claimed in claim 32 wherein said tower structure further comprises a top portion and said means for lifting comprises:
   a) a winching mechanism;
   b) a crane arm;
   c) at least one support guide; and
   d) at least one cable for removable attachment to said means.

* * * * *